United States Patent
Williams et al.

[11] Patent Number: 5,630,892
[45] Date of Patent: May 20, 1997

[54] PNEUMATIC TIRE WITH SPECIFIED TREAD CURVATURE AND/OR SPECIFIED BREAKER CURVATURE

[75] Inventors: Arthur R. Williams, Solihull; Nigel G. Nock, Sutton Coldfield; David H. Clarke, Walsall, all of England

[73] Assignee: Sumitomo Rubber Industries Limited, Hyogo, Japan

[21] Appl. No.: 356,552

[22] Filed: Dec. 15, 1994

[30] Foreign Application Priority Data

Dec. 16, 1993 [GB] United Kingdom ............. 9325715
Dec. 16, 1993 [GB] United Kingdom ............. 9325716

[51] Int. Cl.$^6$ .................. B60C 3/00; B60C 3/04; B60C 11/00; B60C 11/01
[52] U.S. Cl. .............. 152/209 R; 152/454; 152/525; 152/526; 152/538
[58] Field of Search .................. 152/454, 209 R, 152/538, 526, 525

[56] References Cited

U.S. PATENT DOCUMENTS

| | | |
|---|---|---|
| 5,117,886 | 6/1992 | Tokutake . |
| 5,238,038 | 8/1993 | Glover et al. . |
| 5,247,979 | 9/1993 | Asano . |

FOREIGN PATENT DOCUMENTS

| | | |
|---|---|---|
| 0402303 | 12/1990 | European Pat. Off. ......... 152/454 |
| 2014915 | 9/1979 | United Kingdom . |
| 2014916 | 9/1979 | United Kingdom . |
| 2015938 | 9/1979 | United Kingdom . |

*Primary Examiner*—Adrienne C. Johnstone
*Attorney, Agent, or Firm*—Birch, Stewart, Kolasch & Birch, LLP

[57] ABSTRACT

A pneumatic tire for a vehicle comprises a carcass ply extending between two bead regions and passing through a tread region which extends between two tread contact edges, a tread region reinforcing breaker radially outwards of the carcass in the tread region and a ground contacting tread surface curved in the axial direction wherein the curvature of the outer tread surface when the tire is mounted on its design wheel rim and normally inflated has a continuously decreasing radius from a point P which is at a distance SP in the axial direction from the tire circumferential center line equal to 20% of the distance from the tread center to the adjacent tread contact edge.

25 Claims, 2 Drawing Sheets

PNEUMATIC TIRE WITH SPECIFIED TREAD CURVATURE AND/OR SPECIFIED BREAKER CURVATURE

FIELD OF THE INVENTION

The present invention relates to a pneumatic tire for vehicles having a radial tire and a tread reinforcing breaker and is particularly applicable to car tires but not limited thereto.

DESCRIPTION OF CONVENTIONAL ACT

Current vehicles are being made progressively lighter and great demands are made by vehicle makers to lighten tires and improved their other properties including handling, wet grip, etc.

The present radial tire development has been concentrated on making the tire footprint consistent under all conditions but this has resulted in tires with wide flat tread regions for high cornering power in the dry but which are inefficient in relation to wet grip.

SUMMARY OF THE INVENTION

It is an object of the present invention to provide a pneumatic tire which overcome these problems and provides a tire of reduced weight.

According to one aspect of the present invention a pneumatic radial tire for a vehicle comprises a carcass ply extending between two head regions and passing through a tread region which extends between two tread contact edges, a tread region reinforcing breaker radially outwards of the carcass in the tread region and a ground contacting tread surface curved in the axial direction characterized in the curvature of the outer tread surface when the tire is mounted in its design wheel rim and normally inflated has a continuously decreasing radius from a point P which is at a distance SP in the axial direction from the tire circumferential center line equal to 20% of the distance from the tread center to the adjacent tread contact edge. By tread contact edge is meant the edge point axially of the tire at which the tread surface is contacted by the road surface in use of the tire.

The tread contact surface may have a radius of curvature which decreases at a constant rate. Alternatively the curvature may be defined by the locus of the point PT with polar co-ordinates $R, \theta$ having an origin on the circumferential center line C at a distance below the point of intersection of the circumferential center line C with the tread surface wherein $$R = (92.46304 + 50.02951 \times \theta - 109.1216 \times \theta^2 + 43.74487 \times \theta^3 + 7.385639 \times \theta^4 - 4.776894 \times \theta^5) \times (SW/194)$$

as $\theta$ decreases in the range from $\pi/2$ radians to zero and wherein SW is the value in millimeters of the maximum section width of the tire. Preferably the polar co-ordinates $R, \theta$ have an origin on the circumferential center line C at a distance of $(70.63044 \times (SW/194))$mm below the point of intersection of the circumferential center line C with the tread surface.

In a broader aspect of the shape the invention includes a tread surface curve lying within two curves generated with the above ±4% in relation to the radius. More preferably the curve is within ±2% of the radius.

Another aspect of the invention provides a pneumatic tire for a vehicle comprising a carcass ply extending between the bead regions and passing through a tread region which extends between two tread contact edges, a tread region reinforcing breaker radially outwards of the carcass in the tread region and a ground contacting tread surface curved in the axial direction wherein the outer surface of the breaker has a curved shape in the tire axial direction and has a decreasing radius from a point B to the edge of the breaker wherein point B is spaced apart from the tire circumferential centerline by a distance SP equal to 20% of the distance from the tread center to the tread contact edge. The breaker may be at least two breaker plies of fabric which constitutes parallel cords laid at an angle of 5° to 60° to the tire circumferential direction. Also the cords in adjacent breaker plies may be crossed with respect to each other. The ratio $C_B/B2$ between the radial distance $C_B$ from the center to the edge of the breaker and the axial distance B2 from the center to the edge of the breaker may have a value between 0.3 and 0.6. The carcass may be a ply of the tire cords extending in the radial direction wherein the ply extends substantially parallel to the outer surface of the widest breaker ply.

Once again the particular profile may be defined by an equation relating the polar co-ordinates and in broader aspects ranges of ±4% and more preferably ±2% of the radius.

Whilst the invention relates primarily to a tire having a tread region and/or a breaker construction having the declared curvature the said curvature in a preferred arrangement continues along the sidewall regions of the tire substantially from bead region to bead region. The tread region and the radial height of the junction of the sidewall and tread above the base of the tire bead may be between 25% and 50% of the radial height of the center of the tread outer surface above the tire bead base.

Yet another aspect of the invention provides that the thickness of the tread rubber decreases from a point P on the tread surface to the tread edge wherein the point P is set at a distance SP from the circumferential centerline C being equal to 20% of the distance between the circumferential centerline and the tread edge. Also, the ratio TH/SW between the radial distance TH from the center to the edge of the tread and the tire maximum width SW may have a value in the range of 0.15 to 0.3. The aspect ratio SH/SW of the tire maximum section height SH to the tire maximum section width SW may be $$(G/SW)+0.38015$$

wherein G is the height of the flange of the wheel rim on which the normally inflated tire is fitted.

Further aspects of the present invention will become apparent from the following description by way of example only, of one embodiment of the invention in conjunction with the attached drawings in which:

DESCRIPTION OF PREFERRED EMBODIMENTS

Figure 1:
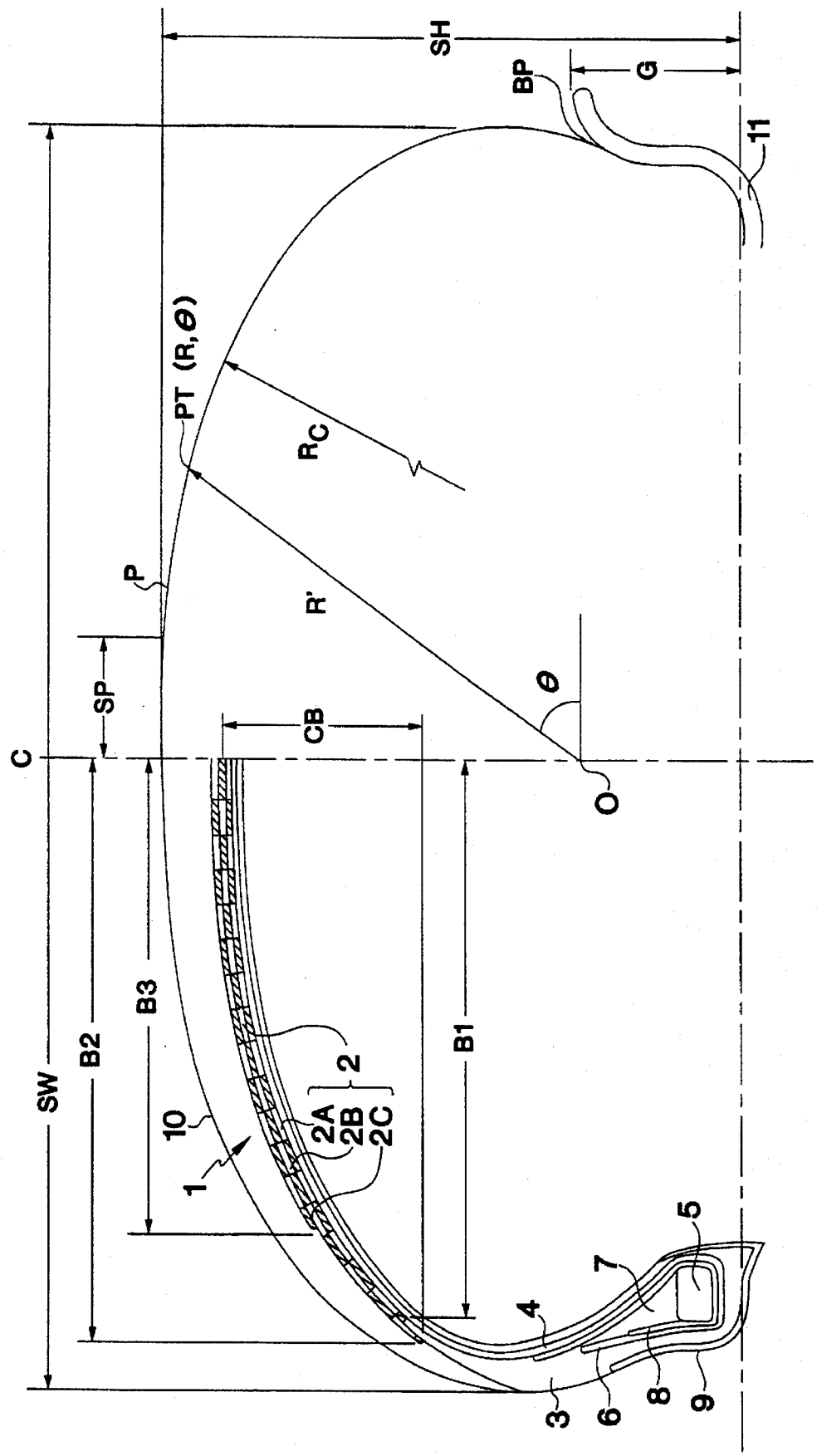
FIG. 1 is a cross-section of a tire with the left-hand part of the drawing showing the construction features and the right-hand part of the drawing the geometrical features of the surface of the tire.

The tire of FIG. 1 comprises a 195.45R16 car tire, for a 6½"×16" wheel rim, and has a tread region 1 reinforced by a breaker assembly 2 and a pair of sidewalls 3. A single ply of radially extending cords provides a carcass reinforcement 4 which extends from bead to bead of the tire and is wrapped at each edge from the inside to the outside in the axial direction around a bead core 5. The edge region 6 of the ply 4 is turned up radially outwards to give a ply turnup. A rubber apex 7 is positioned on top of the bead core 5 in a conventional manner and a chafer 8 is wrapped around the bead 5 inwards of the ply 4 to provide a cushion for the ply around the bead core 5 and apex 7. A clinch strip 9 is also positioned around the bead. The components in the bead provide a substantially conventional bead region.

The tire carcass has a substantially curved cross-sectional shape to match the breaker package which in turn matches a substantially curved tire tread surface of the tread region 1.

The curvature of the tread region is one of the important features of this invention and reference to the right-hand side of the Figure shows that the tread region has a gradually decreasing radius of curvature moving outwards from the centerline of the tire. More specifically the tread region has a radius of curvature which continually decreases to either side of the centerline outwards of a point P on the tread surface which is a distance equal to 20% of the distance from the centerline C to the tread contact edge point. The embodiment has a tread surface shape with the progressively reducing radius of curvature RC defined by an equation which gives the locus of a point PT using polar co-ordinates R and $\theta$ having an origin O on the centerline of the tire cross-section C substantially below the center of the tire tread surface and at a similar height to the top of the flange for the wheel rim 11 on which the tire is mounted. It should be understood however that some variation on the curve is possible. Thus the shape for a practicable tire may be within ±4% of the radius according to the detailed formula which follows and relates specifically to this embodiment. More preferably the shape needs to be within ±2%.

The flange height G provides a contact point BP where the tire sidewall touches the flange. The flange height G for the tire and wheel of the assembly of a body 1 is 17.3 mm. The center O was set at a height from the bead seat diameter D of 20.4 mm. The height of the point O is not critical but needs to be set so that the locus can be calculated. For the embodiment the equation to give the locus which is the tire tread surface shape is $$R = (92.46304 + 50.02951 \times \theta - 109.1216 \times \theta^2 + 43.74487 \times \theta^3 + 7.385639 \times \theta^4 - 4.776894 \times \theta^5) \times (SW/194)$$

where $\theta$ decreases in the range from $\pi/2$ radians to zero, SW is the value of millimeters in the maximum section width of the tire and the origin O is a distance of $70.63044 \times (SW/194)$ millimeters below the point of intersection in the circumferential centerline c with the tread surface. It must be noted that this is applied from the point P along the surface of the full width of the tire tread 1 to give the tire tread surface 10 having the shape defined. The shape may continue to the edge of the tread rubber. However, in the embodiment the shape continues around the sidewall of the tire substantially to the point BP where the tire sidewall contacts the flange of its wheel rim. Thus the sidewalls 2 have the outer profile shape defined by the same equation as the tread.

To clarify the width of the tread (SW) reference should be made to the drawing where the tread region 1 can be seen to extend to substantially the mid-sidewall point which is the widest part of the tire. Thus in this embodiment the tread width SW is the section width of the tire because the tread region extends in this way. This is not an essential feature of the invention for the tread width to equal the section width but is preferred.

Figure 2:
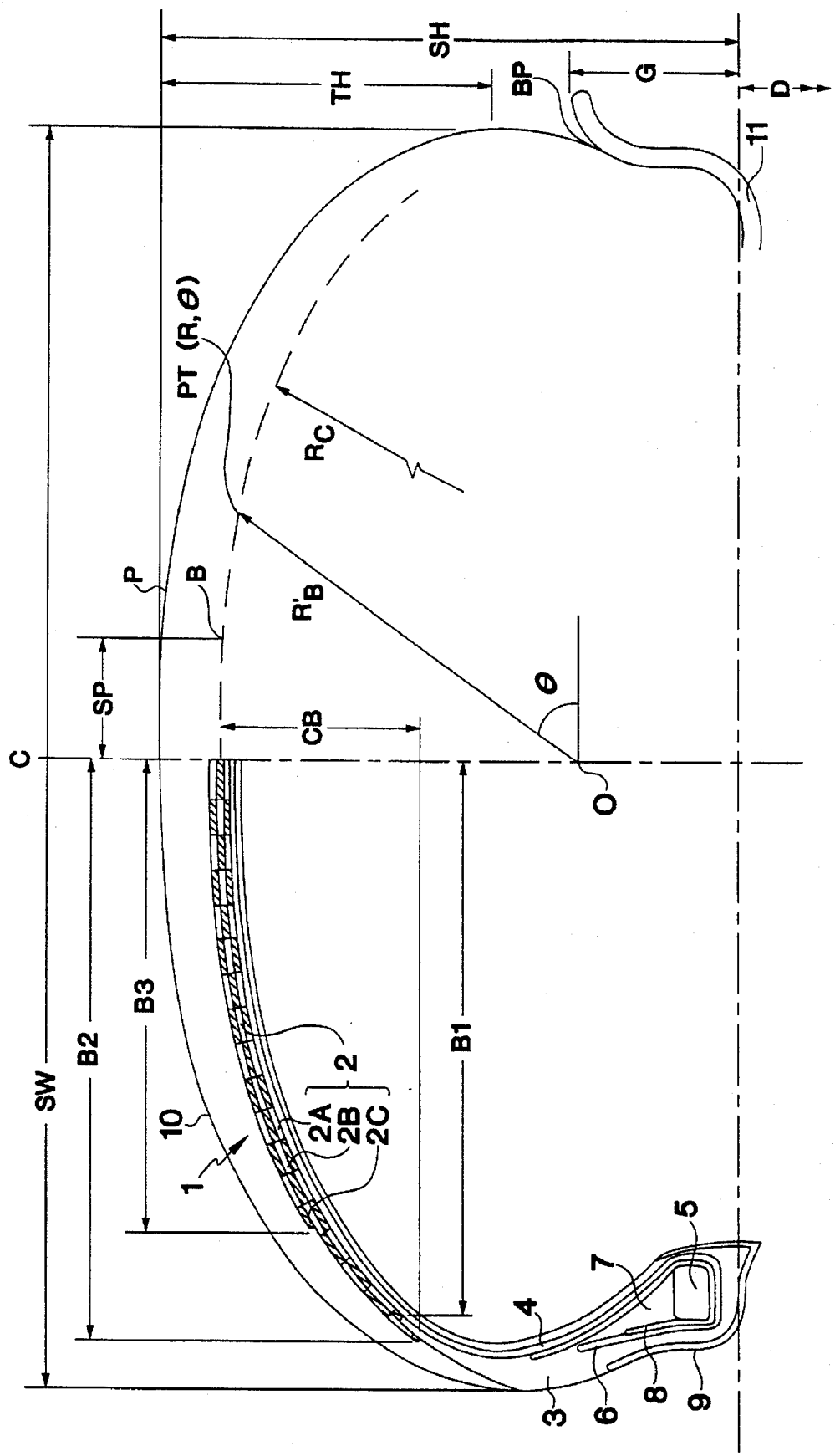
FIG. 2 is a cross-section of a tire with the left-hand part of the drawing showing the construction features and the right-hand of the drawing the geometrical features of the surface of the outer breaker ply.

The above relates to the shape of the tread surface. FIG. 2 utilizes the same numerals to show a construction in which the curvature of the top breaker ply 2B is defined by a similar equation. In this case the curvature of the outer surface of the widest breaker ply is defined by the locus of a point PT with polar co-ordinates $R_B, \theta$ having an origin on the circumferential centerline C at a distance below the point of intersection of the circumferential centerline C with the tread surface wherein $$R_B = (89.02495 + 58.35249 \times \theta - 194.2836 \times \theta^2 + 168.7756 \times \theta^3 - 62.10578 \times \theta^4 + 8.747225 \times \theta^5) \times (SW/194)$$

as $\theta$ decreases in the range from $\pi/2$ radians to zero and wherein SW is the value in millimeters of the maximum section width of the tire.

Once again whilst this is the preferred shape the invention also includes a shape generated by polar co-ordinates where the radius is within ±4% or more preferably ±2% of the above curve radius.

The tread surface has the profile set out in its general shape. This does not exclude the provision of pattern grooves in the surface from normal sipes which are very narrow cuts to quite wide water-retaining grooves in either or both of the circumferential or axial directions. The tread pattern may also include a very wide center groove of the type currently fashionable. The tread region 1 has a rubber compound thickness measured perpendicularly to the surface of the tread which reduces continuously from the center (C) of the tread to each shoulder. This type of tread thickness is unconventional and typically radial tires have an increasing or constant tread thickness towards the shoulder even when the shoulders themselves are rounded to give even wear appearance on the tire in service. The tread reinforcing breaker of the present tire comprises three plies, 2A, 2B and 2C. Beginning with the radially innermost ply 2A the construction comprises an inner breaker ply 2A having a width B1 of 180 mm measured in the axial direction of the tire.

Thus the outer breaker ply in common with the others lies substantially parallel to the tread surface profile 10 which means that the ply itself is cut substantially wider than 180 mm. The next ply 2B has a width B2 which in the finished tire is 180 mm measured in the axial direction and is loaded with cords at an opposite acute angle to the first ply. Finally a third breaker ply 2C is positioned centrally of the tire and has a finished axial width of 150 mm so that its edges do not reach to the edges of the first and second plies 2A and 2B. The three breaker plies 2A, 2B and 2C all comprise aramid cord material (Kevlar Registered Trade Mark) each cut at 25° prior to manufacture. The cord plies are topped with topping compound.

Thus in the embodiment an important feature of the invention is that the profile of the breaker 2 is the same as that of the tread surface 10 so that the package of tread surface, tread thickness and breaker each follow the declared shape.

Finally under the breaker the radial reinforcement carcass 4 comprises nylon reinforcing cords laid substantially at 90° and lying adjacent to the inner breaker ply 2A.

As has been explained the resultant tire has a reinforced tread region of substantial curvature when considered in transverse cross-section. For example in the embodiment shown in FIG. 1 the tread curvature is such that the ratio TH/SW of the radial distance between the tread edge and the tread center to the maximum tire section width has a value of 0.27. This is very different to normal car and truck tires where the intention of the designer has hitherto been to make the breaker as flat a possible to maintain a flat contact between the tread region and the road. In the present tire the combination of tread and breaker shape together with the tread thickness being substantially constant or in fact diminished across the full width of the tire to the shoulders provides a tire in which when the vehicle is running straight the contact patch is substantially less that the width of the tire. Thus the tire has a contact patch which can move to either side of the center line and/or increase in transverse width with lateral/radial changes of load on the wheel concerned.

Initial testing of this new tire has shown that cornering power is substantially improved compared with a traditional radial tire having a flat tread and breaker package. This is believed to be due to the contact patch moving across the tire structure and the tire structure adapting itself to the forces applied thereto. The tire also has a very good runflat performance.

While the embodiment described comprises aramid (Kevlar) cords for the breaker and nylon carcass cords the invention is not limited to such materials. Any of the normal high tensile materials can be used for the breaker package as can two, three, four or more plies. The carcass may also comprise other materials including rayon and may be of single or dual ply construction.

The tire described is a 45 aspect ratio tire and therefore comprises short sidewalls. The invention however is not limited thereto as it resides primarily in the shape of the tread surface and the breaker package thereunder.

Similarly the bead construction may be varied including making the apex strip of different sizes and hardnesses and any of the known bead retention systems may be utilized.

Having now described our invention what we claim is:

1. A pneumatic tire for a vehicle comprising a carcass ply extending between two bead regions and passing through a tread region which extends between two tread contact edges, a tread region reinforcing breaker radially outwards of the carcass in the tread region and a ground contacting tread surface curved in the axial direction wherein the outer tread surface has a curvature when the tire is mounted on a design wheel rim of said tire and normally inflated which has a continuously decreasing radius from a point P which is at a distance SP in the axial direction from the tire circumferential centerline equal to 20% of the distance from the tread center to the adjacent tread contact edge.

2. A pneumatic tire according to claim 1, wherein the continuously decreasing radius continues to the edge of the tread rubber at each side of the tire.

3. A pneumatic tire according to claim 1, wherein the continuously decreasing radius continues to the point of maximum axial width of the tire at each side of the tire.

4. A tire according to claim 1, wherein the tread surface has a radius of curvature which decreases at a constant rate.

5. A tire according to claim 1, wherein the tread surface is a curve lying within the two curves defined by the locus of a point with polar co-ordinates R' and θ where R'=R±4% R wherein $$R = (92.46304 + 50.02951 \times \theta - 109.1216 \times \theta^2 + 43.74487 \times \theta^3 + 7.385639 \times \theta^4 - 4.776894 \times \theta^5) \times (SW/194)$$

as θ decreases in the range from π/2 radians to zero and wherein SW is the value in millimeters of the maximum section width of the tire.

6. A tire according to claim 1, wherein the tread surface is a curve lying within the two curves defined by the locus of a point with polar co-ordinates R' and θ where R'=R±2% R wherein $$R = (92.46304 + 50.02951 \times \theta - 109.1216 \times \theta^2 + 43.74487 \times \theta^3 + 7.385639 \times \theta^4 - 4.776894 \times \theta^5) \times (SW/194)$$

as θ decreases in the range from π/2 radians to zero and wherein SW is the value in millimeters of the maximum section width of the tire.

7. A tire according to claim 1, wherein the tread surface has a curvature defined by the locus of a point PT with polar co-ordinates R,θ having an origin on the circumferential centerline C at a distance below the point of intersection of the circumferential centerline C with the tread surface wherein $$R = (92.46304 + 50.02951 \times \theta - 109.1216 \times \theta^2 + 43.74487 \times \theta^3 + 7.385639 \times \theta^4 - 4.776894 \times \theta^5) \times (SW/194)$$

as θ decreases in the range from π/2 radians to zero and wherein SW is the value in millimeters of the maximum section width of the tire.

8. A tire according to claim 5, wherein the polar co-ordinates R',θ have an origin on the circumferential centerline C at a distance of $(70.63044\times(SW/194))$mm below the point of intersection of the circumferential centerline with the tread surface.

9. A tire according to claim 6, wherein the polar co-ordinates R',θ have an origin on the circumferential centerline C at a distance of $(70.63044\times(SW/194))$mm below the point of intersection of the circumferential centerline with the tread surface.

10. A tire according to claim 7, wherein the polar co-ordinates R',θ have an origin on the circumferential centerline C at a distance of $(70.63044\times(SW/194))$mm below the point of intersection of the circumferential centerline with the tread surface.

11. A tire according to claim 1, wherein the curvature of the outer surface of the tire in the axial direction from the point P on the tread of the tread edge is continued substantially to a point BP on the tire surface in the bead region which is the point at which the tire surface has its profile adapted to fit the wheel rim, said tire being normally inflated and fitted on the wheel rim.

12. A tire according to claim 1, wherein the breaker comprises at least two breaker plies of fabric comprising parallel cords laid at an angle of 5° to 60° to the tire circumferential direction.

13. A tire according to claim 12, wherein the cords in adjacent breaker plies are crossed with respect to each other.

14. A tire according to claim 13, wherein the cords in the adjacent plies are inclined at the centerline of the tire at an angle of 25° to the tire circumferential direction.

15. A tire according to claim 1, wherein the breaker fabric cords comprise aromatic polyamide.

16. A tire according to claim 1, wherein the radially innermost breaker ply is narrower than the adjacent breaker ply.

17. A radial tire according to claim 1, wherein the breaker comprises three plies of breaker fabric comprising cords.

18. A radial tire according to claim 17, wherein the radially outermost breaker ply is narrower than the other plies.

19. A tire according to claim 1, wherein the ratio $C_B/B2$ between the radial distance $C_B$ from the center to the edge of the breaker and the axial distance B2 from the center to the edge of the breaker has a value between 0.3 and 0.6.

20. A tire according to claim 1, wherein the carcass ply comprises nylon cords.

21. A tire according to claim 1, wherein the tire further comprises sidewall regions extending between each bead region and the tread region and the radial height of the junction of the sidewall and tread above the base of the tire bead is between 25% and 50% of the radial height of the center of the tread outer surface above said tire bead base.

22. A tire according to claim 21, wherein the ratio TH/SW between the radial distance TH from the center to the edge of the tread and the tire maximum width SW has a value in the range of 0.15 to 0.3.

23. A tire according to claim 1, wherein the thickness of the tread region decreases from a point P on the tread surface to the tread edge wherein the point P is set at a distance SP from the circumferential centerline C being equal to 20% of the distance between the circumferential centerline and the tread edge.

24. A tire according to claim 1, wherein the carcass comprises a ply of tire cords extending in the radial direction and the ply extends substantially parallel to the outer surface of the widest breaker ply.

25. A tire according to claim 1, wherein the aspect ratio SH/SW of the tire maximum section height SH to the tire maximum section width SW is $$(G/SW)+0.38015$$

wherein G is the height of the flange of the wheel rim on which the tire is fitted, said tire being normally inflated.

* * * * *